J. M. GWINN, Jr.
PROTRACTOR OR DRAFTING IMPLEMENT.
APPLICATION FILED NOV. 19, 1920.
1,383,803.
Patented July 5, 1921.
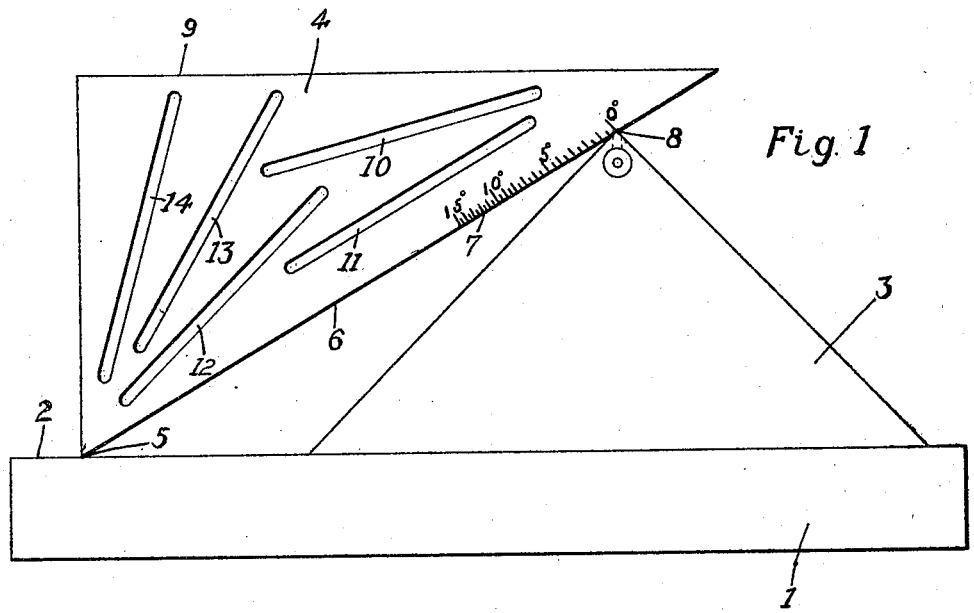
Fig. 1
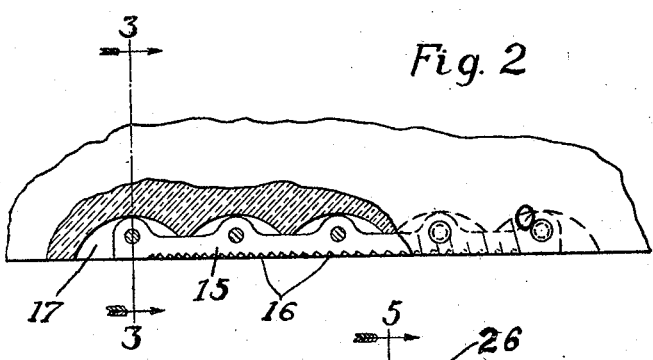
Fig. 2
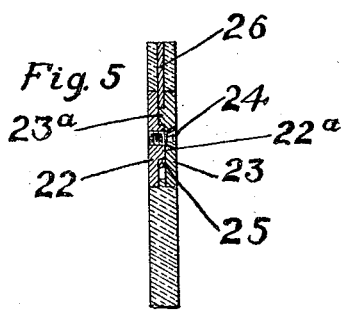
Fig. 3
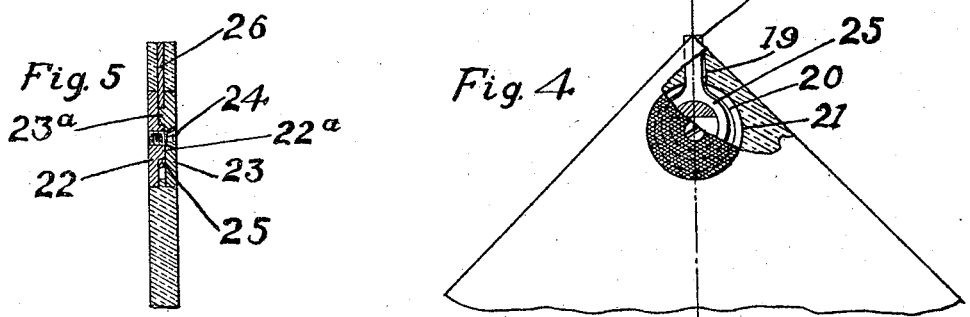
Fig. 5
Fig. 4
Inventor:
Joseph M. Gwinn Jr.
By J.W. Barker
Atty

UNITED STATES PATENT OFFICE.

JOSEPH MARR GWINN, JR., OF NEW ORLEANS, LOUISIANA.

PROTRACTOR OR DRAFTING IMPLEMENT.

1,383,803. Specification of Letters Patent. Patented July 5, 1921.

Application filed November 19, 1920. Serial No. 425,135.

*To all whom it may concern:*

Be it known that I, JOSEPH M. GWINN, Jr., a citizen of the United States, and resident of New Orleans, in the parish of Orleans and State of Louisiana, have invented certain new and useful Improvements in Protractors or Drafting Implements, of which the following is a specification.

This invention relates to drafting implements or protractors, and my improvements are directed particularly to the conjoined use of triangles with a straight edge for service in the production or laying out of angles, through all degrees, with positive accuracy.

Essentially my invention comprises the provision of a straight edged element, a triangular element whose base is set against said straight edge, and an adjustable triangle element one of whose apices is to contact wth said straight edge while one of its edges adjacent to said apex, called its inner edge, is in contact with the vertex of said first named triangle element, and presents its other edge adjacent to said apex, called the outer edge, in planes which lie between two planes at two given degrees of angularity with said straight edge.

Further said adjustable triangle is provided with a number of straight slots arranged variously in different angles relatively to the outer straight edge thereof, to enable the laying out of angles within the range of 90 degrees; and whereby upon reversal of said adjustable triangle for its co-action with the stationary triangle from the opposite side thereof, the variation in angularity is extended to 180 degrees.

While the set angles of the slots in the adjustable triangle may arbitrarily be set equal numbers of degrees apart, the extent of angular variation available by the movement of the adjustable triangle relatively to the other triangle may represent the intermediary degrees. Furthermore, to insure accuracy of adjustment the inner contacting edge of the adjustable triangle is provided with a series of notches in graduated relation, with which the vertex of the other triangle may engage, each of said notches representing a degree or fraction of the number of degrees of angular variation between slots, in order that a fine subdivision in angularity may be thus provided. An external scale is provided to visually indicate the degrees represented by the notches.

Co-action between the notches of the series provided in the inner edge of the adjustable triangle element and the vertex of the other triangle element, which for convenience may be termed the index element, is effected by means of a tongued member which is retractably mounted within the thickness of said index triangle element, in the vertex portion thereof, the end of said tongued element, when it is extended, having two points or corners, each symmetrical with respect to the other about a line perpendicular to the base of, and passing through the vertex of said index element, enabling these opposite corners to be capable of respectively engaging with the notches of the adjustable triangle element in its use at the opposite sides of said index element.

Other features and advantages of my said invention will hereinafter appear.

In the drawings:—

Figure 1 is a plan view of the triangle and straight edge elements, in associated relation for the purpose of the measuring and laying out of angles.

Fig. 2 is a partial view, enlarged, of the adjustable triangle element, said view being broken away and showing inserted and secured within the inner edge portion of said element, a strip of suitable material bearing the graduated notches representing degrees in angularity.

Fig. 3 is a section on the line 3—3 of Fig. 2.

Fig. 4 is a partial plan view of the index triangle element, broken away, showing the retractable tongued element which co-acts with the graduated notches, and the actuating means therefor, and Fig. 5 is a section on the line 5—5 of Fig. 4.

In the example of my invention illustrated herewith, let I indicate a straight edged element, which may be a T-square or equivalent implement having a straight edge, as 2, for use in establishing a plane for the location of certain other implements comprehended in my invention, and whose employment may thus be coördinated for the production of any required degree of angularity.

Thus, in the example shown a right angle triangle 3 is represented as having its hypotenuse, used as a base, seated against the straight edge 2, while another triangle 4 is shown as arranged with its apex 5 seated against said straight edge and its hypotenuse 6, which is provided with a graduated scale 7, in coaction with the vertex 8 of triangle 3. Said triangles are relatively movable along straight edge 2 to thereby vary the angle of right angle edge 9 of triangle 4 within the range of degrees indicated by scale 7. Said scale is here shown as comprising 15 degrees, with the vertex 8 at zero on said scale, and with the edge 9 in a zero plane, or parallel with edge 2. Variations between zero and 90 degrees in the element 4 are provided by a series of straight slots 10, 11, 12, 13 and 14, wherein slot 10 represents a difference of 15 degrees with respect to edge 9, and the other slots represent successive equal differences, the sum of the angles of said slots, plus the 15 degrees of scale 7, available by relative movement between elements 3 and 4, comprising a full range of 90 degrees. If the element 4 be reversed in its position to co-act with element 3 at the opposite right angle edge thereof, then obviously a further range of 90 degrees is available, so that with this apparatus any angle within a full range of 180 degrees can be laid out.

As a mechanical adjunct to my invention whereby accuracy in the setting between the elements 3 and 4 is assured for indexing the scale 7, a strip 15, of metallic or other suitable material, and having notches 16 to correspond with the degrees and divisions thereof comprising scale 7, is inserted within a recess or groove 17 provided therefor in the edge of member 4, at its hypotenuse, said notches serving as means of localizing engagement for the index of member 3. The strip 15 is so contained within its groove 17, being secured therein as by studs 18, that its notched edge is flush with the base edge 6, whereby the triangle 4 may also be used for ordinary purposes.

In order that the index, represented by vertex 8 of triangle 3, may coact with the notches 16, a slot 19 is formed in the vertical axis of element 3, said slot communicating with a circular orifice 20, through element 3, said orifice being counterbored, at 21, on both sides of element 3, to provide bearings.

Two like disks 22, 23, united as by a stud 24, fit respectively in the counter-bored bearings, to comprise a revoluble unit therein, the inner surfaces of said disks each bearing a segment of a circular shoulder that is eccentrically disposed relatively to the disks 22, 23. As shown, the disk 22 bears the segment 22ª and the disk 23 bears segment 23ª, the eccentric thus contrived constituting a revoluble mount for an annulus 25 which carries a shank or tongue 26 that lies within the slot 19.

The revoluble unit thus described is provided with roughened outside surfaces in order that a frictional finger grip thereof may be had for turning said unit, the eccentric action, in such turning, being relied upon to project and retract the tongue or shank 26. The tongue being relatively thin and its end rectangular, presents opposite corners which are each capable of engaging with the notches 16 of recessed strip 15, and said tongue and strip both being of steel or other durable material, not liable to warp, accord permanency and accuracy to these co-acting parts.

It will be observed, in Fig. 4, that the tongue 26 is there extended, the revoluble unit having been turned in one direction about its eccentric bearing to that end, and obviously, by reversing the direction of rotation of said revoluble unit, said tongue will thereby be retracted, and then the triangle 3 can be employed for ordinary purposes.

A clearance in the slot 19 permits the swaying action of the tongue in its retractile movement.

Variations within the spirit and scope of my invention are equally comprehended herein.

I claim:—

1. Apparatus for defining variable angles and comprising two triangle elements and an element having a straight edge, one of said triangle elements having a graduated scale along one edge to co-act with the vertex of the other triangle element to indicate the angle formed by one edge of the first named triangle element with said straight edge, and said triangle elements being adjustable relatively to one another along the plane of said straight edged element.

2. Apparatus for defining angles comprising a straight edged element, a scale bearing triangle element one of whose apices contacts with said straight edged element, and a triangle element one of whose edges contacts with said straight edged element, said triangle elements being relatively movable in the plane of said straight edged element, and the scale bearing triangle element registering different angles in co-action with the vertex of said other triangle element.

3. In apparatus for defining variable angles, in combination, a triangle element having a scale along one edge thereof and a strip recessed within said scale bearing edge, said strip having a series of notches corresponding with the scale indications.

4. In apparatus for defining variable angles, in combination, a triangle element whose vertex serves as an index, said triangle element having a guide-way in its vertical axis, a shank movable in said guide-way, said shank having symmetrical edges to occupy the position of said triangle vertex, and means for retracting and advancing said shank.

5. In apparatus for defining variable angles, in combination, a triangle element whose vertex serves as an index, said triangle element having a slot in its vertical axis and a counterbored orifice, a revoluble unit, with an eccentric portion, mounted in said orifice, an annulus journaled on said eccentric portion, and a shank extending from said annulus through said slot, whereby rotation of said revoluble unit in one direction causes said shank to project at the triangle vertex to serve as an index, and rotation of said revoluble unit in the opposite direction operates to retract said shank.

Signed at Providence in the county of Providence and State of Rhode Island this 17th day of November, A. D. 1920.

JOSEPH MARR GWINN, Jr.